United States Patent
Ahlers et al.

(10) Patent No.: US 9,491,077 B2
(45) Date of Patent: Nov. 8, 2016

(54) NETWORK METRIC REPORTING SYSTEM

(75) Inventors: Tim Ahlers, Seattle, WA (US); Steve Mooney, Seattle, WA (US); John-Anthony Owens, Seattle, WA (US); Greg Vandenberg, Seattle, WA (US); Myk O'Leary, Seattle, WA (US); Aaron Averbuch, Seattle, WA (US); Jeremy Wilson, Seattle, WA (US); Lauren Younger, Seattle, WA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 132 days.

(21) Appl. No.: 11/867,670

(22) Filed: Oct. 4, 2007

(65) Prior Publication Data

US 2009/0019147 A1 Jan. 15, 2009

Related U.S. Application Data

(60) Provisional application No. 60/949,615, filed on Jul. 13, 2007.

(51) Int. Cl.
*G06F 15/173* (2006.01)
*H04L 12/26* (2006.01)

(52) U.S. Cl.
CPC ........... *H04L 43/0876* (2013.01); *H04L 43/04* (2013.01); *H04L 43/06* (2013.01)

(58) Field of Classification Search
CPC .... H04L 43/0876; H04L 43/06; H04L 43/04
USPC ........................................................ 709/224
See application file for complete search history.

(56) References Cited

U.S. PATENT DOCUMENTS

| | | | |
|---|---|---|---|
| 5,383,178 A | 1/1995 | Unverrich | |
| 5,396,485 A * | 3/1995 | Ohno et al. | 370/217 |

(Continued)

FOREIGN PATENT DOCUMENTS

| | | |
|---|---|---|
| EP | 1315334 | 5/2003 |
| EP | 1370025 | 12/2003 |

(Continued)

OTHER PUBLICATIONS

Written Opinion of the International Searching Authority for International Application No. PCT/US2008/063335 mailed Sep. 22, 2008 (4 pages).

(Continued)

*Primary Examiner* — Viet Vu
*Assistant Examiner* — Herman Belcher
(74) *Attorney, Agent, or Firm* — Patent Capital Group

(57) ABSTRACT

A tool for monitoring the use of devices in an interconnected network. Desired network information, such as the use of browsers on the networked devices, the use of other applications hosted on the networked devices, and the speed and volume of data traffic to and within the network, may be collected by one or more network management tools operating within the network, and then provided to an outside reporting server. In response, the reporting server then organizes and reports the collected information to one or more authorized parties associated with the network. The reporting server may send the collected network information directly to the authorized parties via electronic mail, or provide access to the collected network information by posting it on a secured Web site.

16 Claims, 6 Drawing Sheets

(56) References Cited

U.S. PATENT DOCUMENTS

| | | | |
|---|---|---|---|
| 5,420,572 A | 5/1995 | Dolin et al. | |
| 5,712,914 A | 1/1998 | Aucsmith et al. | |
| 5,758,083 A | 5/1998 | Singh et al. | |
| 5,768,483 A | 6/1998 | Maniwa et al. | |
| 5,774,667 A | 6/1998 | Garvey et al. | |
| 5,838,907 A | 11/1998 | Hansen | |
| 5,974,237 A | 10/1999 | Shurmer et al. | |
| 5,978,568 A * | 11/1999 | Abraham et al. | 709/224 |
| 6,006,272 A | 12/1999 | Aravamudan et al. | |
| 6,023,723 A | 2/2000 | McCormick et al. | |
| 6,157,950 A * | 12/2000 | Krishnan | 709/223 |
| 6,282,548 B1 * | 8/2001 | Burner et al. | |
| 6,304,904 B1 * | 10/2001 | Sathyanarayan | H04L 12/2602 709/205 |
| 6,456,306 B1 | 9/2002 | Chin et al. | |
| 6,530,018 B2 | 3/2003 | Fleming | |
| 6,584,074 B1 | 6/2003 | Vasamsetti et al. | |
| 6,631,118 B1 | 10/2003 | Jones | |
| 6,678,250 B1 | 1/2004 | Grabelsky et al. | |
| 6,728,262 B1 | 4/2004 | Woram | |
| 6,778,505 B1 | 8/2004 | Bullman et al. | |
| 6,801,941 B1 | 10/2004 | Stephens et al. | |
| 6,892,245 B1 | 5/2005 | Crump et al. | |
| 6,925,085 B1 | 8/2005 | Krishna et al. | |
| 6,954,785 B1 | 10/2005 | Martin et al. | |
| 6,965,614 B1 | 11/2005 | Osterhout et al. | |
| 6,980,556 B2 | 12/2005 | Vimpari | |
| 7,020,701 B1 | 3/2006 | Gelvin et al. | |
| 7,020,720 B1 | 3/2006 | Donahue et al. | |
| 7,027,808 B2 | 4/2006 | Wesby | |
| 7,039,688 B2 * | 5/2006 | Matsuda et al. | 709/220 |
| 7,042,988 B2 | 5/2006 | Juitt et al. | |
| 7,046,139 B2 * | 5/2006 | Kuhn et al. | 340/539.15 |
| 7,080,141 B1 | 7/2006 | Baekelmans et al. | |
| 7,111,054 B2 | 9/2006 | Lo | |
| 7,155,493 B1 * | 12/2006 | Weber | 709/218 |
| 7,177,957 B2 | 2/2007 | Vance | |
| 7,187,461 B2 * | 3/2007 | Schlonski et al. | 358/1.15 |
| 7,200,551 B1 | 4/2007 | Senez | |
| 7,240,106 B2 | 7/2007 | Cochran et al. | |
| 7,249,171 B2 | 7/2007 | Goto | |
| 7,269,653 B2 | 9/2007 | Mentze et al. | |
| 7,283,517 B2 | 10/2007 | Yan et al. | |
| 7,310,664 B1 | 12/2007 | Merchant et al. | |
| 7,319,873 B2 | 1/2008 | Zhang et al. | |
| 7,340,512 B2 | 3/2008 | Cochran et al. | |
| 7,388,839 B2 | 6/2008 | Chafle et al. | |
| 7,392,310 B2 | 6/2008 | Motoyama et al. | |
| 7,418,702 B2 | 8/2008 | Tsao | |
| 7,421,466 B2 | 9/2008 | Haines | |
| 7,457,737 B2 | 11/2008 | Patiejunas | |
| 7,460,546 B2 | 12/2008 | Anderson, IV | |
| 7,475,133 B2 | 1/2009 | Nuggehalli | |
| 7,496,660 B2 * | 2/2009 | Blaisdell et al. | 709/224 |
| 7,499,999 B2 * | 3/2009 | Ocepek et al. | 709/225 |
| 7,506,048 B1 | 3/2009 | Motoyama et al. | |
| 7,509,415 B2 | 3/2009 | Baekelmans et al. | |
| 7,545,762 B1 * | 6/2009 | McConnell et al. | 370/310.2 |
| 7,565,418 B2 | 7/2009 | Ferrari et al. | |
| 7,581,039 B2 * | 8/2009 | Martinez et al. | 710/22 |
| 7,603,710 B2 | 10/2009 | Harvey et al. | |
| 7,657,612 B2 | 2/2010 | Manchester et al. | |
| 7,769,409 B2 | 8/2010 | Harris et al. | |
| 7,783,777 B1 | 8/2010 | Pabla et al. | |
| 7,787,416 B2 | 8/2010 | Gidwani | |
| 7,823,199 B1 | 10/2010 | Rathi et al. | |
| 7,853,880 B2 | 12/2010 | Porter | |
| 7,962,605 B2 * | 6/2011 | Chen | 709/224 |
| 8,159,949 B2 | 4/2012 | Pham | |
| 8,660,019 B2 | 2/2014 | Schryer et al. | |
| 2001/0039580 A1 | 11/2001 | Walker et al. | |
| 2002/0004935 A1 | 1/2002 | Huotari et al. | |
| 2002/0010866 A1 | 1/2002 | McCullough et al. | |
| 2002/0026503 A1 | 2/2002 | Bendinelli et al. | |
| 2002/0026505 A1 | 2/2002 | Terry | |
| 2002/0112076 A1 | 8/2002 | Rueda et al. | |
| 2002/0116544 A1 | 8/2002 | Barnard et al. | |
| 2002/0138649 A1 * | 9/2002 | Cartmell et al. | 709/245 |
| 2002/0147938 A1 * | 10/2002 | Hamilton et al. | 714/6 |
| 2002/0161865 A1 | 10/2002 | Nguyen | |
| 2002/0161867 A1 | 10/2002 | Cochran et al. | |
| 2002/0174207 A1 | 11/2002 | Battou | |
| 2002/0191556 A1 | 12/2002 | Krishnarajah et al. | |
| 2002/0194305 A1 * | 12/2002 | Sadeghi et al. | 709/218 |
| 2002/0196463 A1 | 12/2002 | Schlonski et al. | |
| 2003/0005112 A1 * | 1/2003 | Krautkremer | 709/224 |
| 2003/0018889 A1 | 1/2003 | Burnett et al. | |
| 2003/0033402 A1 | 2/2003 | Battat et al. | |
| 2003/0040813 A1 | 2/2003 | Gonzales et al. | |
| 2003/0041238 A1 | 2/2003 | French et al. | |
| 2003/0055953 A1 * | 3/2003 | Motoyama et al. | 709/224 |
| 2003/0061336 A1 | 3/2003 | Van Den Bosch et al. | |
| 2003/0069947 A1 | 4/2003 | Lipinski | |
| 2003/0078965 A1 | 4/2003 | Cocotis et al. | |
| 2003/0078999 A1 | 4/2003 | Lund et al. | |
| 2003/0086425 A1 | 5/2003 | Bearden et al. | |
| 2003/0097439 A1 | 5/2003 | Strayer et al. | |
| 2003/0115298 A1 | 6/2003 | Baker | |
| 2003/0115314 A1 | 6/2003 | Kawashima | |
| 2003/0187985 A1 | 10/2003 | Rohling et al. | |
| 2003/0195937 A1 | 10/2003 | Kircher et al. | |
| 2003/0200303 A1 | 10/2003 | Chong | |
| 2003/0200318 A1 | 10/2003 | Chen et al. | |
| 2003/0221122 A1 | 11/2003 | Hatori | |
| 2003/0229688 A1 | 12/2003 | Liang | |
| 2004/0003292 A1 | 1/2004 | Kato | |
| 2004/0005873 A1 | 1/2004 | Groenendaal et al. | |
| 2004/0015575 A1 | 1/2004 | Motoyama | |
| 2004/0019675 A1 * | 1/2004 | Hebeler et al. | 709/224 |
| 2004/0030620 A1 | 2/2004 | Benjamin et al. | |
| 2004/0039704 A1 | 2/2004 | Gilliam et al. | |
| 2004/0040023 A1 | 2/2004 | Ellis et al. | |
| 2004/0049714 A1 | 3/2004 | Marples et al. | |
| 2004/0064558 A1 | 4/2004 | Miyake | |
| 2004/0083299 A1 | 4/2004 | Dietz et al. | |
| 2004/0093383 A1 | 5/2004 | Huang et al. | |
| 2004/0111505 A1 | 6/2004 | Callahan et al. | |
| 2004/0146006 A1 | 7/2004 | Jackson | |
| 2004/0155899 A1 | 8/2004 | Conrad | |
| 2004/0156346 A1 | 8/2004 | O'Neill | |
| 2004/0162986 A1 * | 8/2004 | Metzger | 713/176 |
| 2004/0172469 A1 | 9/2004 | Takahashi et al. | |
| 2004/0193709 A1 | 9/2004 | Selvaggi et al. | |
| 2004/0199630 A1 | 10/2004 | Sarkissian et al. | |
| 2004/0199647 A1 | 10/2004 | Ramarao | |
| 2004/0203592 A1 | 10/2004 | Kermode et al. | |
| 2004/0204051 A1 | 10/2004 | Scott et al. | |
| 2004/0228277 A1 * | 11/2004 | Williams | 370/230 |
| 2004/0236759 A1 | 11/2004 | Young | |
| 2004/0255023 A1 | 12/2004 | Motoyama | |
| 2005/0004866 A1 | 1/2005 | Bonalle et al. | |
| 2005/0005013 A1 | 1/2005 | Saint-Hilaire et al. | |
| 2005/0018241 A1 | 1/2005 | Azami | |
| 2005/0050189 A1 | 3/2005 | Yang | |
| 2005/0050190 A1 | 3/2005 | Dube | |
| 2005/0054326 A1 | 3/2005 | Rogers | |
| 2005/0060535 A1 * | 3/2005 | Bartas | 713/154 |
| 2005/0063350 A1 | 3/2005 | Choudhury et al. | |
| 2005/0078681 A1 * | 4/2005 | Sanuki et al. | 370/395.5 |
| 2005/0085244 A1 | 4/2005 | Choi et al. | |
| 2005/0086197 A1 | 4/2005 | Boubez et al. | |
| 2005/0086282 A1 | 4/2005 | Anderson et al. | |
| 2005/0091504 A1 | 4/2005 | Shirogane | |
| 2005/0111420 A1 | 5/2005 | Fuji | |
| 2005/0114490 A1 | 5/2005 | Redlich et al. | |
| 2005/0125527 A1 | 6/2005 | Lu et al. | |
| 2005/0149626 A1 | 7/2005 | Manchester et al. | |
| 2005/0160138 A1 | 7/2005 | Ishidoshiro | |
| 2005/0165828 A1 | 7/2005 | Lango et al. | |
| 2005/0165919 A1 | 7/2005 | Qian et al. | |
| 2005/0184852 A1 | 8/2005 | Lee et al. | |
| 2005/0198221 A1 | 9/2005 | Manchester et al. | |
| 2005/0198274 A1 | 9/2005 | Day | |
| 2005/0216602 A1 * | 9/2005 | Armstrong et al. | 709/250 |

(56) References Cited

U.S. PATENT DOCUMENTS

| | | |
|---|---|---|
| 2005/0228881 A1* | 10/2005 | Reasor et al. ............... 709/224 |
| 2005/0229238 A1 | 10/2005 | Ollis et al. |
| 2005/0234568 A1 | 10/2005 | Chung et al. |
| 2005/0234683 A1 | 10/2005 | Graves et al. |
| 2005/0235227 A1 | 10/2005 | Martineau et al. |
| 2005/0240665 A1 | 10/2005 | Gu et al. |
| 2005/0240758 A1 | 10/2005 | Lord et al. |
| 2005/0243777 A1 | 11/2005 | Fong |
| 2006/0015939 A1 | 1/2006 | Aston et al. |
| 2006/0031457 A1 | 2/2006 | Motoyama |
| 2006/0036847 A1 | 2/2006 | Bush et al. |
| 2006/0037036 A1 | 2/2006 | Min et al. |
| 2006/0037075 A1 | 2/2006 | Frattura et al. |
| 2006/0041891 A1 | 2/2006 | Aaron |
| 2006/0101109 A1 | 5/2006 | Nishio |
| 2006/0106918 A1 | 5/2006 | Evert et al. |
| 2006/0120293 A1 | 6/2006 | Wing |
| 2006/0129664 A1 | 6/2006 | Reimert et al. |
| 2006/0136424 A1* | 6/2006 | Nuggehalli et al. ............ 707/10 |
| 2006/0153080 A1 | 7/2006 | Palm |
| 2006/0168167 A1 | 7/2006 | Kushalnagar et al. |
| 2006/0168195 A1 | 7/2006 | Maturana et al. |
| 2006/0168263 A1* | 7/2006 | Blackmore ................... 709/230 |
| 2006/0172734 A1 | 8/2006 | Tak et al. |
| 2006/0258341 A1 | 11/2006 | Miller |
| 2006/0272014 A1 | 11/2006 | McRae et al. |
| 2006/0277291 A1* | 12/2006 | Misbach ....................... 709/224 |
| 2006/0280189 A1 | 12/2006 | McRae et al. |
| 2006/0291443 A1 | 12/2006 | Harrington et al. |
| 2007/0015463 A1 | 1/2007 | Abel |
| 2007/0022185 A1 | 1/2007 | Hamilton et al. |
| 2007/0058567 A1 | 3/2007 | Harrington et al. |
| 2007/0074125 A1* | 3/2007 | Platt et al. ................... 715/760 |
| 2007/0076621 A1 | 4/2007 | Malhotra et al. |
| 2007/0094390 A1* | 4/2007 | Nussey ......................... 709/225 |
| 2007/0106768 A1 | 5/2007 | Frietsch et al. |
| 2007/0111568 A1 | 5/2007 | Ferrari et al. |
| 2007/0115950 A1 | 5/2007 | Karaguz et al. |
| 2007/0130286 A1 | 6/2007 | Hopmann et al. |
| 2007/0133569 A1 | 6/2007 | Lee et al. |
| 2007/0143749 A1* | 6/2007 | Date et al. ................... 717/172 |
| 2007/0146782 A1 | 6/2007 | Lehotsky et al. |
| 2007/0204150 A1 | 8/2007 | Jokela et al. |
| 2007/0219963 A1* | 9/2007 | Soroca ............................. 707/3 |
| 2007/0253384 A1 | 11/2007 | Kanagala et al. |
| 2007/0254609 A1 | 11/2007 | Rosenthal et al. |
| 2007/0268506 A1 | 11/2007 | Zeldin |
| 2007/0268514 A1 | 11/2007 | Zeldin |
| 2007/0268515 A1 | 11/2007 | Freund et al. |
| 2007/0268516 A1 | 11/2007 | Bugwadia et al. |
| 2007/0276931 A1 | 11/2007 | Mahdavi et al. |
| 2007/0291945 A1 | 12/2007 | Chuang et al. |
| 2008/0005319 A1* | 1/2008 | Anderholm et al. ......... 709/224 |
| 2008/0008125 A1 | 1/2008 | Pham et al. |
| 2008/0037552 A1 | 2/2008 | Dos Remedios et al. |
| 2008/0043989 A1 | 2/2008 | Furutono et al. |
| 2008/0049779 A1 | 2/2008 | Hopmann et al. |
| 2008/0052384 A1 | 2/2008 | Marl et al. |
| 2008/0065760 A1 | 3/2008 | Damm et al. |
| 2008/0070603 A1 | 3/2008 | Mao |
| 2008/0134164 A1 | 6/2008 | Stich et al. |
| 2008/0144660 A1 | 6/2008 | Godlewski |
| 2008/0175187 A1 | 7/2008 | Lowry et al. |
| 2008/0216154 A1 | 9/2008 | Fontaine |
| 2008/0243699 A1* | 10/2008 | Hilerio et al. .................. 705/59 |
| 2009/0017832 A1 | 1/2009 | Tebbs et al. |
| 2009/0019141 A1 | 1/2009 | Bush et al. |
| 2009/0019147 A1 | 1/2009 | Ahlers et al. |
| 2009/0019314 A1 | 1/2009 | Younger et al. |
| 2009/0037606 A1 | 2/2009 | Diab |
| 2009/0046656 A1 | 2/2009 | Kitazoe et al. |
| 2009/0052338 A1 | 2/2009 | Kelley et al. |
| 2009/0055514 A1 | 2/2009 | Tebbs et al. |
| 2009/0109897 A1 | 4/2009 | Woo |
| 2010/0020694 A1 | 1/2010 | Jones |
| 2010/0035595 A1 | 2/2010 | Duggal et al. |
| 2010/0093278 A1 | 4/2010 | Abel |
| 2010/0250725 A1 | 9/2010 | Meenan et al. |
| 2011/0047254 A1 | 2/2011 | Vainionpaa et al. |
| 2011/0235549 A1 | 9/2011 | Ahlers et al. |
| 2012/0008529 A1 | 1/2012 | Averbuch et al. |
| 2013/0046722 A1 | 2/2013 | Hanson |
| 2013/0250801 A1 | 9/2013 | Kennedy et al. |

FOREIGN PATENT DOCUMENTS

| | | |
|---|---|---|
| EP | 1538792 | 6/2005 |
| EP | 1553729 | 7/2005 |
| EP | 1638258 | 3/2006 |
| EP | 1639751 A1 | 3/2006 |
| EP | 1701478 A1 | 9/2006 |
| EP | 1894314 A2 | 3/2008 |
| EP | 1965541 A1 | 9/2008 |
| EP | 2009877 A1 * | 12/2008 |
| EP | 2324652 A1 | 5/2011 |
| GB | 2411801 | 9/2005 |
| JP | 2001-222497 A | 8/2001 |
| JP | 2001-352328 A | 12/2001 |
| KR | 2004-0047209 A1 | 7/2004 |
| KR | 10-2005-031175 A | 4/2005 |
| KR | 2005-0078541 A | 8/2005 |
| KR | 2005-0094247 A | 9/2005 |
| WO | WO2005/004401 | 1/2005 |
| WO | WO2007/001629 | 1/2007 |
| WO | WO2007/136804 | 11/2007 |
| WO | WO 2008/156898 | 12/2008 |
| WO | WO 2009/011962 | 1/2009 |
| WO | WO 2009/011963 | 1/2009 |
| WO | WO 2009/011964 | 1/2009 |
| WO | WO 2009/011965 | 1/2009 |
| WO | WO 2009/011966 | 1/2009 |
| WO | WO2010/016855 | 2/2010 |
| WO | WO 2011/119264 | 9/2011 |

OTHER PUBLICATIONS

International Search Report for International Application No. PCT/US2008/063308 mailed Oct. 30, 2008 (2 pages).

Written Opinion of the International Searching Authority for International Application No. PCT/US2008/063308 mailed Oct. 30, 2008 (4 pages).

International Search Report for International Application No. PCT/US2008/063333 mailed Sep. 26, 2008 (2 pages).

Written Opinion of the International Searching Authority for International Application No. PCT/US2008/063333 mailed Spetember 26, 2008 (4 pages).

International Search Report for International Application No. PCT/US2008/059490 mailed Apr. 21, 2009 (2 pages).

International Preliminary Report on Patentability issued Oct. 6, 2009 (1 page) and Written Opinion of the International Searching Authority mailed Apr. 21, 2009 (3 pages) for International Application No. PCT/US2008/059490.

Notification Concerning Transmittal of International Preliminary Report on Patentability (1 page), International Preliminary Report on Patentability (1 page), and Written Report of the International Searching Authority (4 pages) mailed Jan. 28, 2010 for International Application No. PCT/US2008/063318.

PCT Notification of the International Search Report and the Written Opinion of the International Searching Authority, or the Declaration, International Application No. PCT/US2008/063318, mailed Sep. 25, 2008, 6 pgs.

U.S. Appl. No. 11/696,638, filed Apr. 4, 2007, entitled "Network Management Providing Network Health Information and Lockdown Security," Inventor(s) Steve Bush et al.

Marcia Zangrilli, et al., "Using Passive Traces of Application Traffic in a Network Monitoring System," copyright 2004 IEEE.

Kazuya Kubo, et al., "Hybrid Peer-to-Peer System for Network Monitoring of Field Devices," Downloaded May 14, 2009 at 10:08 from IEEE Xplore, copyright 2003 SICE, 6 pages.

(56) References Cited

OTHER PUBLICATIONS

International Search Report for International Application No. PCT/US2008/063335 mailed Sep. 22, 2008 (1 page).
Barb Bowman, "Introduction to Windows XP Service Pack 2," Published Aug. 25, 2004, 8 pages; © 2010 Microsoft Corporation http://www.microsoft.com/windowsxp/using/security/expert/bowman_introtosp2.mspx.
Microsoft TechNet, "The Cable Guy—Jun. 2004: The New Wireless Network Setup Wizard in Windows XP Service Pack 2," Published May 25, 2004; Updated Aug. 4, 2004, 10 pages; © 2010 Microsoft Corporation; http://technet.microsoft.com/en-us/library/bb878069.aspx.
Microsoft Corporation, "Windows Connect Now—UFD for Windows XP Specification," © 2010, Updated Sep. 15, 2006, 1 page; http://www.microsoft.com/whdc/connect/Rally/WCN-UFD_XPspec.mspx.
Microsoft Corporation, "Windows Connect Now—UFD for Windows XP," Version 1.1 © 2010—Sep. 15, 2006, 33 pages; http://www.microsoft.com/whdc/connect/Rally/WCN-Netspec.doc.
Microsoft Corporation, "Windows Connect Now—UFD and Windows Vista Specification," Version 1.0 © 2010—Sep. 15, 2006, 1 page; http://www.microsoft.com/whdc/connect/Rally/WCN-UFD_Vistaspec.mspx.
Microsoft Corporation, "Windows Connect Now—UFD Windows Vista" Version 1.0 © 2010—Sep. 15, 2006, 28 pages; http://www.microsoft.com/whdc/connect/Rally/WCN-UFD_Vistaspec.doc.
Microsoft Corporation, "Windows Connect Now—Access Point has No USB Port in Wireless Networking," © 2010, printed Mar. 24, 2010, 2 pages; http://www.microsoft.com/communities/newsgroups/en-us/default.aspx?dg=microsoft.public.windows.networking.wireless&tid=c55b567e-fec3-43be-8bd1-a3216125c7f9&cat=en_US_d02fc761-3f6b-402c-82f6-ba1a8875c1a7&lang=en&cr=&sloc=en-us&m=1&p=1.
Flip Video, "Quick Start Guide: FlipshareTV," © 2009 Cisco Systems, Inc., 19 pages; http://www.theflip.com/pdf/en-US/FlipShareTVQuickStartGuide.pdf.
"Wi-Fi Certified™ for Wi-Fi Protected Setup™: Easing the User Experience for Home and Small Office Wi-Fi® Networks," © 2007, 14 pages; http://www.wi-fi.org/files/kc/20090123_Wi-Fi_Protected_Setup.pdf.
"Cisco Access Router USB Flash Memory Module and USB eToken Hardware Installation Guide," © 2006 Cisco Systems, Inc., 12 pages; https://www.cisco.com/en/US/docs/routers/access/2800/hardware/notes/mithril.html.
"Wi-Fi Alliance™ for Wi-Fi Protected Setup Specification," Version 1.0h, Dec. 2006, 110 pages.
Byoung-Koo Kim/Jong-Su Jang/Tai M. Chung, Design of Network Security Control System for Cooperative Intrusion Detection, 2002, pp. 389-398.
International Preliminary Report on Patentability issued Jan. 19, 2010 (1 page) and Written Opinion of the International Searching Authority mailed Oct. 30, 2008 (4 pages) for International Application No. PCT/US2008/063308.
International Preliminary Report on Patentability issued Jan. 19, 2010 (1 page) and Written Opinion of the International Searching Authority mailed Sep. 26, 2008 (4 pages) for International Application No. PCT/US2008/063333.
International Preliminary Report on Patentability issued Jan. 19, 2010 (1 page) and Written Opinion of the International Searching Authority mailed Sep. 22, 2008 (4 pages) for International Application No. PCT/US2008/063335.
EPO Apr. 5, 2012 Search Report and Written Opinion from European Application 08769420.4; 8 pages.
PCT Oct. 11, 2012 Notification Concerning Transmittal of International Preliminary Report on Patentability and the International Preliminary Report on Patentability and Written Opinion of the International Searching Authority from Application No. PCT/US2011/024462; 9 pages.
U.S. Appl. No. 13/235,007, filed Sep. 16, 2011, entitled "Configuring a Secure Network," Inventor(s) Aaron H. Averbuch, et al.
EPO Nov. 15, 2007 European Search Report and Opinion from European Application No. EP07017509; 8 pages.
Khedr, Mohamed, et al., "Acan-Ad Hoc Context Aware Networks," Online! 2002, XP002300569; 5 pages http://citeseerx.ist.psu.edu/viewdoc/summary?doi=10.1.1.20.1469.
Krishnamurthy, Lakshman, et al., "Meeting the Demands of the Digital Home with high-Speed Multi-Hop Wireless Networks," Intel Technology Journal, vol. 6, Nov. 15, 2002, pp. 57-68; http://download.intel.com/technology/itj/2002/volume06issue04/vol6iss4_interoperable_home_infrastructure.pdf.
"Near Field Communication White Paper," Ecma International, 2005; 12 pages http://www.ecma-international.org/activities/Communications/tc32-tg19-2005-012.pdf.
PCT Oct. 27, 2004 International Search Report from International Application No. PCT/US2004/021429; 3 pages.
PCT Jan. 3, 2006 International Preliminary Report on Patentability and Written Opinion of the International Search Authority from International Application No. PCT/US2004/021429; 7 pages.
PCT Dec. 24, 2007 International Preliminary Report on Patentability and Written Opinion of the International Search Authority from International Application No. PCT/US2006/17500; 6 pages.
PCT Aug. 7, 2007 International Search Report from International Application No. PCT/US06/17500; 1 page.
PCT Nov. 21, 2008 International Preliminary Report on Patentability and Written Opinion of the International Search Authority from International Application No. PCT/US2007/012016; 5 pages.
PCT Jan. 4, 2008 International Search Report from International Application No. PCT/US07/12016; 1 page.
PCT Apr. 24, 2009 International Search Report from International Application No. PCT/US2008/08544; 2 pages.
PCT Aug. 2, 2011 International Preliminary Report on Patentability and Written Opinion of the International Search Authority from International Application No. PCT/US2008/08544; 7 pages.
PCT Aug. 25, 2011 International Search Report and Written Opinion of the International Searching Authority from International Application No. PCT/US2011/024462.
Rasheed, Yasser, et al, "Home Interoperability Framework for the Digital Home," Intel Technology Journal, vol. 6, Nov. 15, 2002, pp. 5-16; http://download.intel.com/technology/itj/2002/volume06issue04/vol6iss4_interoperable_home_infrastructure.pdf.
"Universal Plug and Play Device Architecture, UPnP, Version 1.0," Microsoft Corporation, Protocols, Jun. 8, 2000; 54 pages http://upnp.org/specs/arch/UPnPDA10_20000613.pdf.
Walker, Mark, et al., "Remote I/O: Freeing the Experience from the Platform with UPnP Architecture," Intel Technology Journal, vol. 6, Nov. 15, 2002, pp. 30-36; http://download.intel.com/technology/itj/2002/volume06issue04/vol6iss4_interoperable_home_infrastructure.pdf.
Karygiannos, Tom, et al., "Wireless Network Security 802.11 Bluetooth and Handheld Devices," NIST Special Publication 800-48, Technology Administration, Dept. of Commerce, 2002, 119 pages.
U.S. Appl. No. 13/029,335, filed Feb. 17, 2011, entitled "Network Management," Inventor(s) Steven M. Bush, et al.
U.S. Appl. No. 13/030,982, filed Feb. 18, 2011, entitled "Network Management," Inventor(s) Steven M. Bush, et al.
U.S. Appl. No. 13/031,121, filed Feb. 18, 2011, entitled "Network Management," Inventor(s) Steven M. Bush, et al.

\* cited by examiner

NETWORK METRIC REPORTING SYSTEM

PRIORITY CLAIM

This application claims priority from U.S. Provisional Patent Application No. 60/949,615, filed Jul. 13, 2007, entitled "NETWORK REPORTS," which is hereby incorporated by reference in its entirety as if fully set forth herein.

FIELD OF THE INVENTION

Embodiments of the present invention are directed toward a system for monitoring the usage of members of a network. Various embodiments of the invention may be suitable for monitoring the usage devices in a small network, collecting information relating to the usage of these devices, and providing a report on the monitored usage to an authorized party associated with the small network.

BACKGROUND OF THE INVENTION

Computers have become commonplace tools in modern society, and many businesses and residences now have one or more computing devices. In a small business, for example, some employees may each use a desktop computer or laptop computer. Some employees may even use more portable computers such as personal digital assistants or "smart" wireless telephones. Similarly, with a family sharing a residence, each family member may have his or her personal computer, or the family members may share one or more computers. Further, both small businesses and personal residences may include various computing appliances that incorporate or otherwise interact with computers. For example, a home residence may include a refrigerator, a "Voice over Internet Protocol" telephone, a digital music server, a digital camera, or an environmental control system that includes or interacts with a computer.

In order to optimize the use and flexibility of these computing devices, a business or family may link them together to form a small private network. Typically, each of the computing devices is connected to a router through a network adapter. The router then "routes" packets of data to and from each computing device. With this type of small private network, the router can in turn be connected to one or more larger private networks or a public network, such as the Internet. By sending and receiving messages through the router, each networked computing device may then communicate with computing devices outside of the private network. In this arrangement, the router serves as a "gateway" device that provides a gateway to outside of the private network.

While this type of small or "home" network can provide enhanced utility for its member computing devices, even a small network can be very difficult for a non-technical person to set up and maintain. Accordingly, various software developers have created tools to assist novice users in setting up or managing a small network. Conventionally, these tools were embedded in a larger software product, such as an operating system or a utility application. More recently, however, Pure Networks of Seattle, Wash. has developed a dedicated software application tool for managing small networks. This software application tool, available from Pure Networks under the name NETWORK MAGIC, is described in detail in U.S. Provisional Patent Application No. 60/634,432, filed Dec. 7, 2004, entitled "Network Management" and naming Steve Bush et al. as inventors, and U.S. patent application Ser. No. 11/297,809, filed on Dec. 7, 2005, entitled "Network Management" and naming Steve Bush et al. as inventors, which applications, along with U.S. Provisional Patent Application No. 60/789,522, filed Apr. 4, 2006, entitled "Network Management," U.S. patent application Ser. No. 10/916,642, filed on Aug. 10, 2004, entitled "Service Licensing And Maintenance For Networks," U.S. patent application Ser. No. 11/457,783, filed on Jul. 14, 2006, entitled "Network Device Management," and U.S. patent application Ser. No. 11/457,763, filed on Jul. 14, 2006, entitled "Network Device Setup Utility," are incorporated entirely herein by reference.

In a household setting, one or more devices in a network may be available to children ranging from preschoolers to teenagers. Accordingly, a parent may wish to limit the use of one or more of the computing devices in the network. For example, a parent may wish to prevent a very young child from using a networked video game or digital video recorder. Alternately, a parent may desire to prevent an older child from accessing a Web site with sexually explicit content. While a variety of software programs are available that purport to allow a parent to block a child's access to sexually explicit content over the Internet, these programs do not allow a parent to monitor other uses of devices in a household network.

BRIEF SUMMARY OF THE INVENTION

An embodiment of the invention includes a tool for monitoring the use of devices in an interconnected network. Desired network information, such as the use of browsers on the networked devices, the use of other applications hosted on the networked devices, and the speed and volume of data traffic to and within the network, may be collected by one or more network management tools operating within the network, and then provided to an outside reporting server. In response, the reporting server then organizes and reports the collected information to one or more authorized parties associated with the network. The reporting server may send the collected network information directly to the authorized parties via electronic mail, or provide access to the collected network information by posting it on a secured Web site.

BRIEF DESCRIPTION OF THE DRAWING

Preferred and alternative embodiments of the present invention are described in detail below with reference to the following figures.

DETAILED DESCRIPTION OF THE INVENTION

Network Environment

Figure 1:
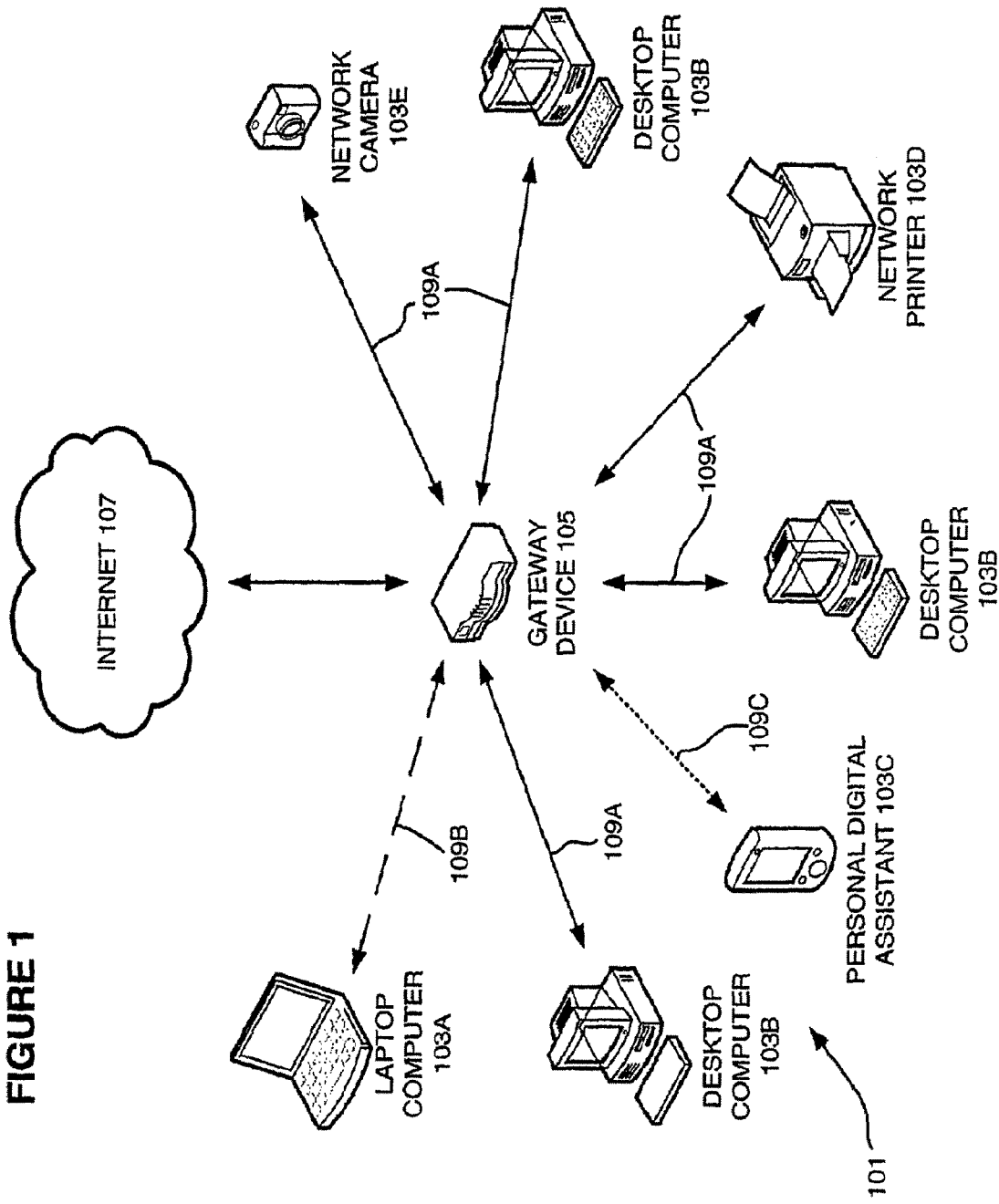
FIG. 1 is a functional block diagram of a network operating environment in which an embodiment of the present invention may be implemented.

As previously noted, various embodiments of the invention may be employed with a small network. FIG. 1 illustrates an example of this type of small network. The network 101 may include a variety of different computing devices or "nodes". For example, the network 101 may include one or more laptop computers 103A, one or more desktop computers 103B, and one or more personal digital assistants 103C. In addition to these computers, the network 101 may also include one or more computing appliances, which are not as versatile as a conventional programmable computer, but which nonetheless may be configured to exchange data over a network. Such network appliances may include, for example, one or more printers 103D and one or more cameras 103E, as illustrated in FIG. 1. Other small networks that can be used with various aspects of the invention may include any suitable computing devices, such as telephones that exchange voice information in data packets (sometimes generically referred to as "Voice over Internet Protocol (VoIP) telephones), digital video recorders, televisions, streaming media players, and digital music servers, among others.

Each of these networked devices 103 communicates, either directly or indirectly, with a gateway device 105. In turn, the gateway device 105 typically will communicate with an external device or network. An external network may be another private network, or it may be a public network, such as the Internet 107. Thus, a gateway device is a device that can steer electronic data from one network to another network. Typically, a gateway device serves as a node on two incompatible networks (i.e., networks that use different communication protocol formats) and it can convert data from one network's communication protocol format into the other network's communication protocol format. As used herein, the term "small network" refers to a network made up of networked devices that each employ the same network address to communicate with the same gateway device, together with the gateway device itself.

The network devices 103 may be connected to the gateway device 105 using any suitable communication medium. For example, in the illustrated network 101, the desktop computers 103B are connected to the gateway device 105 through a hard-wired connection 109A (such as an Ethernet cable), while the laptop computer 103A is connected to the gateway device 105 through a IEEE 802.11 wireless connection 109B and the personal digital assistant 103C is connected to the gateway device 105 through a Bluetooth wireless connection 109C.

It should be appreciated that, as used throughout this application, the term "connect" and its derivatives (e.g., connection, connected, connects) includes both direct and indirect connections. Thus, with the network illustrated in FIG. 1, the laptop computer 103A may be connected to the gateway device 105 using a wireless transceiver incorporated into the laptop computer 103A and a wireless transceiver incorporated into the gateway device 105. Alternately, the laptop computer 103A may be connected to the gateway device 105 using a wireless transceiver external to the laptop computer 103, the gateway device 105, or both.

Typically, the gateway device 105 will be a router. As will be appreciated by those of ordinary skill in the art, a router routes data packets from the networked devices 103 to an external device or network. With some networks, however, the gateway device 105 alternately may be a computer performing router functions, a hub, a bridge, or "layer-3" switch. As will also be appreciated by those of ordinary skill in the art, the computing devices or "nodes" making up the network 101 can communicate with the gateway device 105 using one or more defined communication protocols, such as the Transmission Control Protocol (TCP) and the Internet Protocol (IP).

With these communication protocols, each computing device 103 and gateway device 105 in the network 101 can be assigned a logical address. For example, if the network 101 is connected to the Internet 107 through an Internet service provider, the Internet service provider can assign the gateway device 105 a logical Internet Protocol (IP) address. The Internet service provider may also provide the gateway device 105 with a block of logical Internet Protocol (IP) addresses for the gateway device 105 to reassign to each network device 103. Alternatively, the gateway device 105 can itself assign a range of logical Internet Protocol (IP) addresses to each network device 103, and then use a translation operation (e.g., a Network Address Translation (NAT) operation) to route data packets that it receives to the appropriate network device 103. This type of logical address typically is unrelated to the particular computing device to which it is assigned. Instead, a logical address identifies the relationship of that computing device to other computing devices in the network.

In addition to a logical address, each network device typically can also have a physical address. For example, most computing devices capable of communicating over a network, including routers, employ a network adapter with a media access control (MAC) address. This type of physical address is assigned to a network adapter according to standards (referred to as Project 802 or just 802 standards, which are incorporated entirely herein by reference) set forth by the Institute of Electrical and Electronic Engineers (IEEE). More particularly, these standards define a 48-bit and 64-bit physical address format for network devices. The first 14 bits of the address are assigned by the IEEE Registration Authority, and uniquely identify the manufacturer of the network adapter. The remaining bits are then assigned by the manufacturer to uniquely identify each network adapter produced by the manufacturer. Consequently, the physical address of a network adapter is unique across all networks unless manually changed by the user. The physical address is unique to the network adapter, and is independent of a computing device's relationship to other computing devices in a network. Thus, the physical address does not change over time or between uses in different networks.

Network Device Environment

A network may include both virtual devices and physical devices. Physical network devices can then include both computer devices and computing appliance devices. A "computer" may generally be characterized as a device that can be programmed to perform a number of different, unrelated functions. Examples of computers can thus include programmable personal computers, such as desktop computers and laptop computers. In addition, programmable media-purposed computers (e.g., "media adapters and servers"), network attached storage devices, programmable entertainment-purposed computers (e.g., video game consoles), some programmable personal digital assistants and some telephones (such as wireless "smart" telephones) may be characterized as computers in a network. A "computing appliance" then may generally be characterized as a device that is limited to primarily performing only specific functions. Examples of a computing appliance may thus include, for example, printers, cameras, telephones that exchange voice information in data packets (sometimes generically referred to as "Voice over Internet Protocol (VoIP) telephones or telephone adapters), digital video recorders, televisions, voice over Internet protocol (VoIP) adapters, print servers, media adapters, media servers, photo frames, data storage servers, routers, bridges and wireless access points.

As will be appreciated by those of ordinary skill in the art, there may be no clear defining line between "computer" network devices and "computing appliance" network devices in a network. For example, a sophisticated print server may be programmable to additionally or alternately function as a data storage server, while a programmable media-purposed computer or programmable personal digital assistant may have restricted functionality due to limited memory, input devices or output devices. Accordingly, as used herein, the term "computer" can refer to any network device that is capable of implementing a network management tool according to one or more aspects of the invention, such as a personal programmable computer. The term "computer appliance" then can refer to a network device that typically cannot implement a network management tool according to at least one aspect of the invention without additional augmentation. The term "computing device" is then used herein to include both computers and computing appliances.

With conventional networks located in a home, small office or other local environment, a network management tool according to various aspects of the invention can be implemented on a programmable personal computer, such as a desktop or laptop computer. A general description of this type of computer will therefore now be described.

Figure 2:
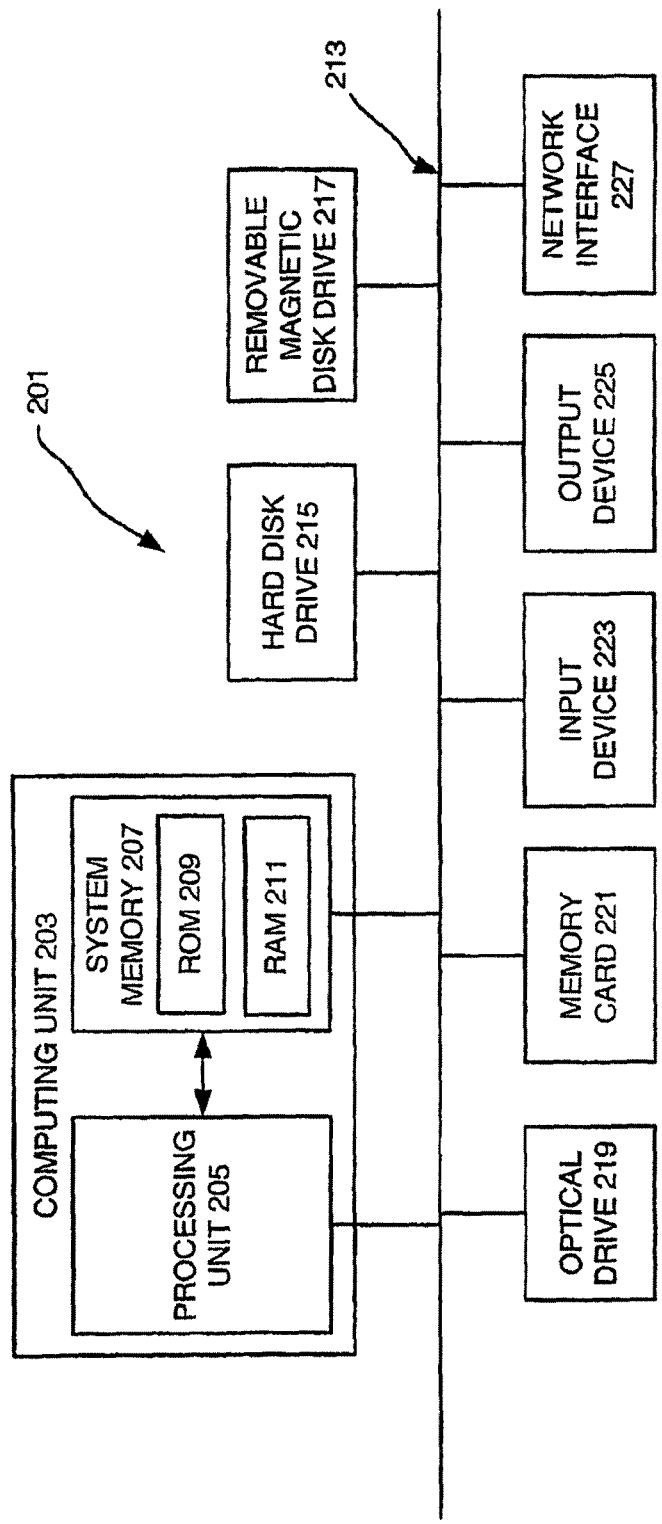
FIG. 2 is a functional block diagram of an operating environment in which an embodiment of the present invention may be implemented.

An illustrative example of such a computer 201 as may be present in the network 101 described above is illustrated in FIG. 2. As seen in this figure, the computer 201 has a computing unit 203. The computing unit 203 typically includes a processing unit 205 and a system memory 207. The processing unit 205 may be any type of processing device for executing software instructions, but can conventionally be a microprocessor device. The system memory 207 may include both a read-only memory (ROM) 209 and a random access memory (RAM) 211. As will be appreciated by those of ordinary skill in the art, both the read-only memory (ROM) 209 and the random access memory (RAM) 211 may store software instructions for execution by the processing unit 205.

The processing unit 205 and the system memory 207 are connected, either directly or indirectly, through a bus 213 or alternate communication structure to one or more peripheral devices. For example, the processing unit 205 or the system memory 207 may be directly or indirectly connected to additional memory storage, such as the hard disk drive 215, the removable magnetic disk drive 217, the optical disk drive 219, and the flash memory card 221. The processing unit 205 and the system memory 207 also may be directly or indirectly connected to one or more input devices 223 and one or more output devices 225. The input devices 223 may include, for example, a keyboard, touch screen, a remote control pad, a pointing device (such as a mouse, touchpad, stylus, trackball, or joystick), a scanner, a camera or a microphone. The output devices 225 may include, for example, a monitor display, television, printer, stereo, or speakers.

Still further, the computing unit 203 can be directly or indirectly connected to one or more network interfaces 227 for communicating with a network. This type of network interface 227, also sometimes referred to as a network adapter or network interface card (NIC), translates data and control signals from the computing unit 203 into network messages according to a communication protocol, such as the Transmission Control Protocol (TCP), the Internet Protocol (IP), and the User Datagram Protocol (UDP). These protocols are well known in the art, and thus will not be described here in more detail. An interface 227 may employ any suitable connection agent for connecting to a network, including, for example, a wireless transceiver, a power line adapter, a modem, or an Ethernet connection.

It should be appreciated that one or more of these peripheral devices may be housed with the computing unit 203 and bus 213. Alternately or additionally, one or more of these peripheral devices may be housed separately from the computing unit 203 and bus 213, and then connected (either directly or indirectly) to the bus 213. Also, it should be appreciated that both computers and computing appliances may include any of the components illustrated in FIG. 2, may include only a subset of the components illustrated in FIG. 2, or may include an alternate combination of components, including some components that are not shown in FIG. 2.

It should be noted that, while a general description of a programmable personal computer was provided above, various aspects of the invention may be implemented on any desired device capable of supporting embodiments of the invention. For example, with some aspects of the invention, the network management tool may be implemented on special purposed programmable computers, such as a programmable media or entertainment-purposed computers, or personal digital assistants. Accordingly, the above description of a programmable personal computer should be understood as illustrative rather than limiting.

A computing appliance may have any combination of the components of the computer 201 discussed above. More typically, however, a computing appliance can be simpler to optimize the performance of a specific function, and thus may have only a subset of these components. For example, a computing appliance may have only a computing unit 203, an input device 223 or an output device 225, and a network interface 227. As will be apparent from the following description, however, a computing appliance will have sufficient computing resources to implement a desired embodiment of the invention in order to provide information to or receive information from a client operating on a separate computing device.

Network Management Tool

Figure 3:
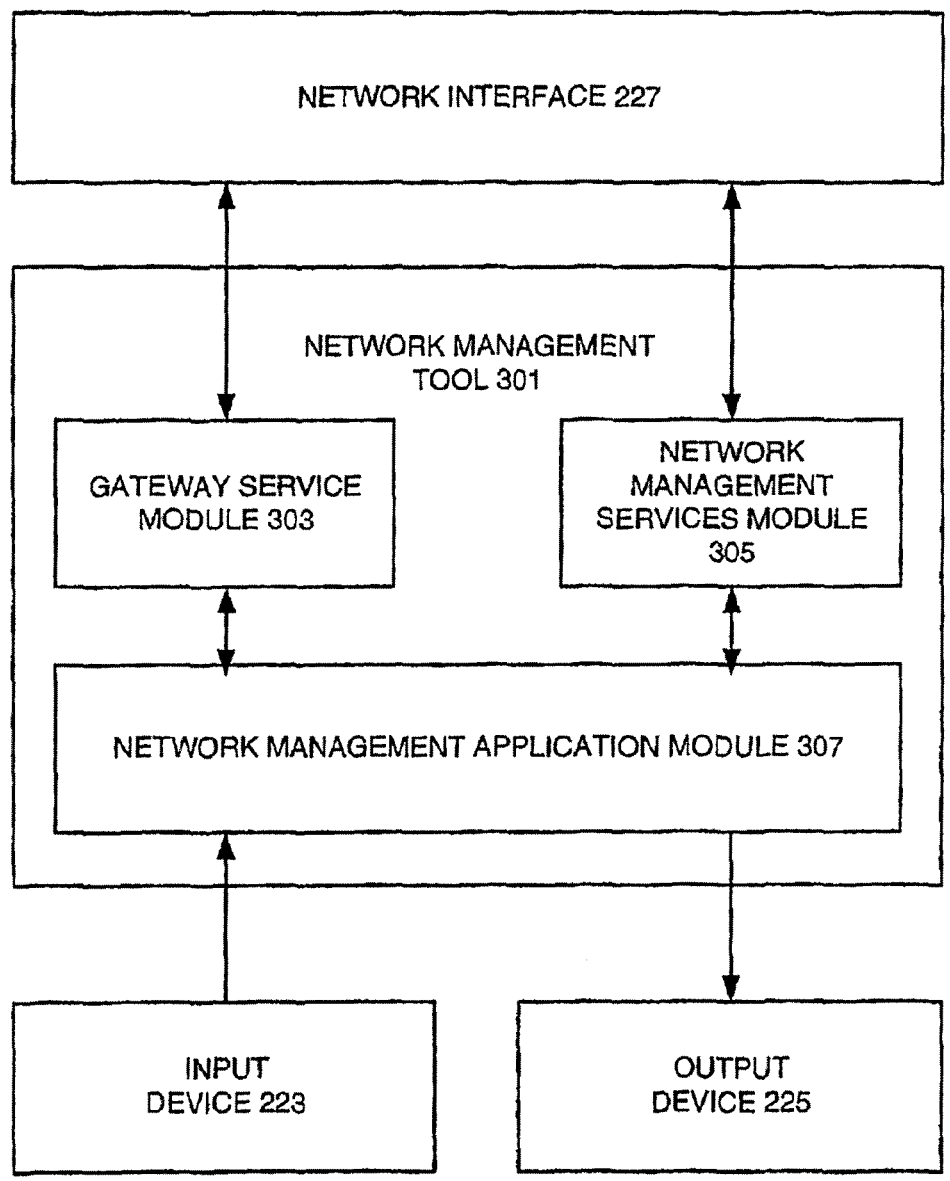
FIG. 3 is a functional block diagram of a component of an embodiment of the present invention in the operating environment of FIG. 2.

FIG. 3 illustrates an example of a network management tool 301 that may be employed according to various aspects of the invention. In the illustrated example, the tool 301 is hosted or otherwise executed by a programmable personal computer 201 of the type illustrated in FIG. 2. The network management tool 301 includes a gateway service module 303, a network management services module 305, and network management application module 307. Both the gateway service module 303 and the network management services module 305 are connected, either directly or indirectly, to the network interface 227 of the computer 201. As will be described in detail below, the gateway service module 303 and the network management services module 305 communicate with various networks and network devices through the network interface 227. The network management services module 305 provides a set of network services that are used by the network application module 307. The network management application module 307 is then connected, either directly or indirectly, to the input device 223 and the output device 225 of the computer 201.

As will be described in further detail below, the network management tool 301 allows a user to monitor the status of devices on an electronic network, such as a network employing the Ethernet protocol located in a home or small business. The network management tool 301 may also allow a user to administer various tasks associated with the network or devices in the network. To perform these functions, the gateway service module 303 detects and identifies the gateway, which typically is a router, through which the network is connected to other networks. The gateway service module 303 also generates a unique name for the gateway.

Once the gateway for the network has been detected, identified and named, the network management services module 305 obtains and stores information relating to the various devices in the network. More particularly, the network management services module 305 detects each device in the network. For example, the network management services module 305 can identify and detect other computers, networked printers and print servers, networked scanners, networked cameras, VoIP telephones and VoIP telephone adapters, networked digital video recorders, networked televisions, data storage servers, bridges, networked game consoles, media adapters, networked photo frames, wireless access points and network adapters for each of these other devices. It then queries those devices to identify each network device and to collect information relating to each device. For example, the network management services module 305 may determine one or more properties for a network device, such as its Media Access Control (MAC) address, its Internet Protocol (IP) address, and the other network devices to which it is connected. The network management services module 305 also detects and identifies devices locally connected to the computer 201, such as local printers, local cameras, local scanners, and local storage devices.

After collecting this network information, the network management services module 305 constructs a network information data structure to organize and store the information collected by both the gateway service module 303 and the network management services module 305. The network management services module 305 can interact with the services provided by the local operating system for gathering device, network, and operation system status and other statuses. For example, with some aspects of the invention, the network management services module 305 creates a markup language file storing the collected network information. More particularly, the network management services module 305 can create a data object for each network device. The data object may be represented in a markup language, such as the extensible markup language (XML). A data object for a device may include an identifier for the device and the determined properties for that device. The data objects for each device can then be organized in a hierarchical fashion into a single data file.

In addition to determining and storing the properties of network devices, the network management services module 305 also communicates with implementations of the network management tool 301 on other computers in the network. More particularly, the network management services module 305 detects instances of the network management tool 301 running on other computers in the network. The network management services module 305 then establishes a communication channel with those instances of the network management tool 301 that have the proper credentials. In this manner, the instances of the network management tool 301 sharing the proper credentials form an association of trusted network management tools 301. The network management services modules 305 can then exchange determined device properties over the communication channels. By exchanging the device properties, each instance of the network management tool 301 can maintain a current copy of a data structure containing the device properties of all of the devices in the network.

The network management application module 307 then coordinates the information managed by the gateway service module 303 and the network management services module 305. More particularly, the network management application module 307 initiates a call to both the gateway service module 303 and to the network information service module 305 to begin their services. The network management application module 307 also provides one or more user interfaces displaying the information obtained and stored by the network management services module 305. These services may or may not also be made available to other applications through programming interfaces.

A user may employ such an interface to monitor the status of the network and the network devices. For example, with some aspects of the invention, the network management application module 307 employs the connection information stored in the network information data structure to create a graphical map of the network. The map may include a graphical icon representing each device, and another graphic to represent connections between the devices. It may, for example, use one type of icon to indicate a wired connection, and another type of icon to indicate a wireless connection. The map may also show the status of the various devices in the network, such as whether a device is presently connected to the network.

With some aspects of the invention, the network management application module 307 may provide interfaces that allow the user to administer one or more functions related to the operation of the network. For example, the network management application module 307 may provide a user interface that permits a user to modify the contents in the network information data structure maintained by the network management services module 305. As noted above, this change may subsequently be shared with other instances of the network management tool 301 in a trusted association, thereby propagating the change throughout the network. The network management application module 307 may also provide a user interface that allows a user to share one or more resources on the computer 201 with other computers in the network. For example, a user interface provided by the network management application module 307 may allow a user to share a data resource, such as a folder or data file. Alternately or additionally, a user interface provided by the network management application module 307 may allow a user to share a physical resource, such as a printer, scanner, or a storage device.

With some aspects of the invention, the various monitoring and administration functionality available to the user may be provided through a single user interface, such a map of the network. Alternately, the network management application module 307 may provide this functionality through multiple user interfaces that can be selected by a user.

Examples and aspects of network management tools, such as the network management tool 301, that may be employed according to various implementations of the invention are discussed in more detail in, for example, U.S. patent application Ser. No. 11/467,534 filed on Aug. 25, 2006, entitled "Network Administration Tool Employing A Network Administration Protocol" and naming Brett Marl as inventor, which application in turn claims priority to U.S. patent application Ser. No. 11/297,809 filed on Dec. 7, 2005, entitled "Network Management" and naming Steve Bush et al. as inventors, which application in turn claims priority to U.S. Provisional Patent Application No. 60/634,432, filed Dec. 7, 2004, entitled "Network Management" and naming Steve Bush et al. as inventors, each of which applications are incorporated entirely herein by reference. U.S. patent application Ser. No. 11/457,783, filed Jul. 14, 2006, entitled "Network Device Management" and naming Brett Marl as inventor is incorporated entirely herein by reference as well.

Monitoring/Reporting System

Figure 4:
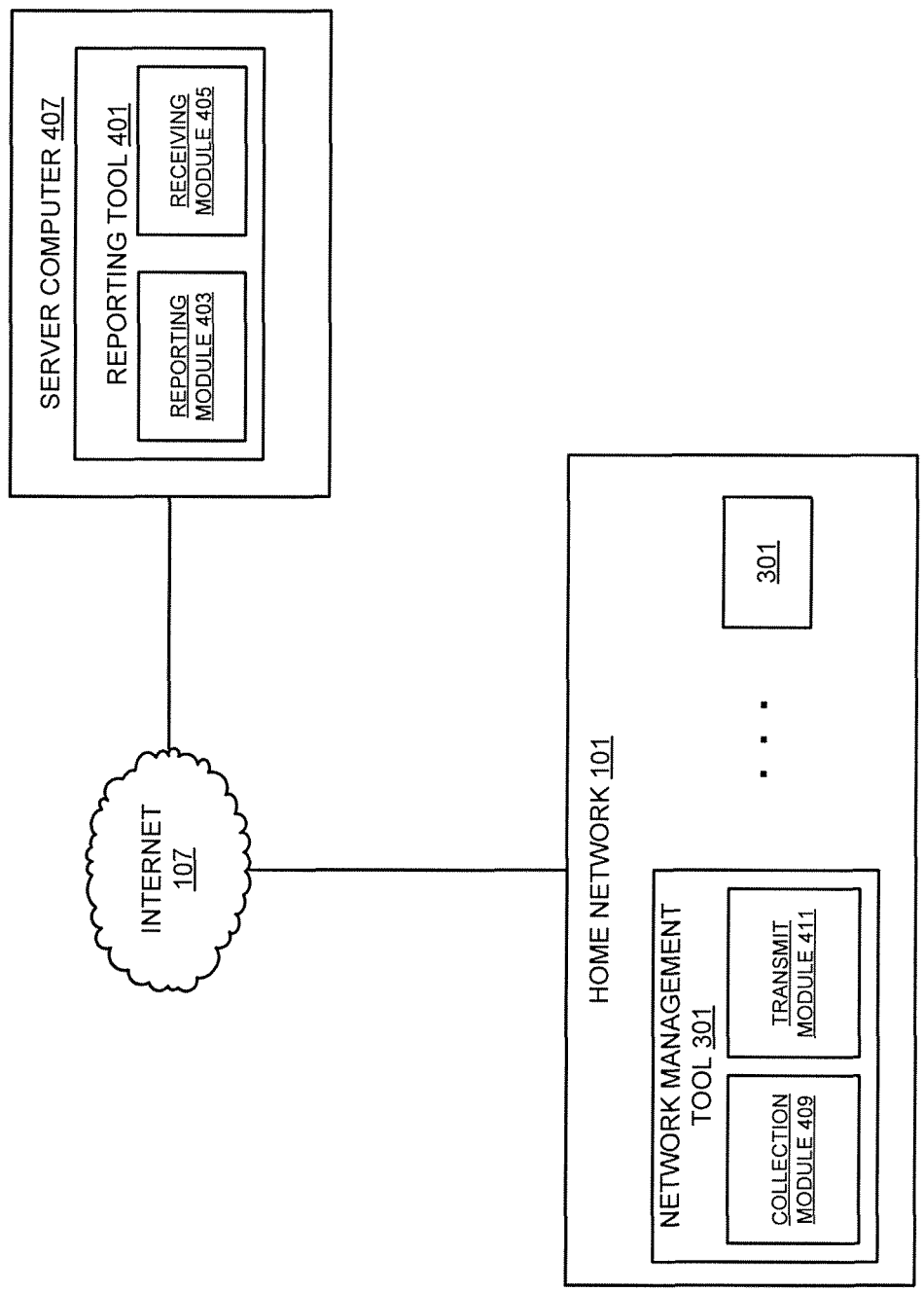
FIG. 4 is a functional block diagram of an embodiment of the present invention implemented in a network operating environment.

As shown in FIG. 4, with various embodiments of the invention a monitoring system may include a reporting tool 401 that includes a reporting module 403 and a receiving module 405 implemented on a server computer 407 remote from the network 101. The server 407 and network 101 are remote from each other in at least the sense that there is at least one intermediary electronic device (e.g., Internet 107) separating the two.

As will be discussed more fully hereinafter, or as otherwise discussed in the patent applications incorporated by reference herein, one or more instantiations of a network management tool 301 implemented on computing devices (not shown in FIG. 4) in the network 101 can provide network information to remote devices or entities, such as the reporting tool 401. As illustrated in FIG. 4, the tool 301 may include an information collection module 409 and an information transmission module 411, the functionality of each of which is provided by one or more of the gateway service module 303, network management services module 305 and network management application module 307. Using the techniques described herein, or otherwise in the patent applications incorporated by reference herein, the information collection module 409 of the network management tool 301 of a computing device can collect a wide variety of information from which useful reports can be prepared.

Figure 5:
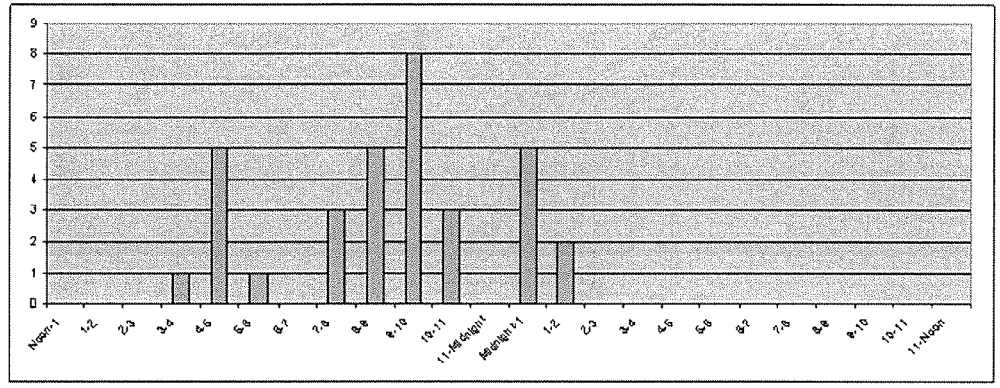
FIG. 5 is an illustrative view of a report generated according to an embodiment of the invention.

In an embodiment, the collection module 409 can determine which websites have been accessed within a predetermined time period (e.g., 24 hours) by one or more browsers operating on the associated computing device. As illustrated in FIG. 5, a list 503 (FIG. 5) of these websites may subsequently be presented in a report.

In an embodiment, tool 301 can include, refer to or otherwise access on the Internet 107 a dataset that includes a risk or trustworthiness rating for website URLs. This rating information is then cross-referenced by tool 301 with the "websites visited" section of the network report to increase its value to the user. If, for example, each website listed in the report as being visited were indicated in the report with a red cross or green check next to it, or were otherwise categorized into "low risk," "high risk," "adult material," etc., then the reader of the report can quickly discern on a daily basis those websites about which he or she should be concerned. Moreover, tool 301 can also flag or otherwise highlight in the report websites that had never before been visited (i.e., web sites that are listed in the report for the first time).

Additionally, the collection module 409 can compile information indicating how much time was spent on, and/or how much data was downloaded from, such websites. In an embodiment, and to facilitate this functionality, the tool 301 can install on the computing device a low-level packet-capture driver known as a Network Driver Interface Specification (NDIS) driver (not shown). The NDIS driver allows the tool 301 to evaluate in detail every network packet that flows in or out of the computing device. As such, by examining these packets and re-assembling them into their constituent TCP/IP streams, the tool 301 can evaluate the entire data-transaction set between a web browser and the web site it is viewing.

When a browser communicates with a typical web-site, many HTTP requests are sent. The first request can be for the root page content (HTML), and then subsequent content such as images or external script files or style sheets may be requested. The tool 301 may filter out this sub-content of a page and determine only the root page requests. Furthermore, the tool 301 is operable to identify the process requesting the network traffic so as to determine whether such traffic is user-driven or merely attributable to a background request by an application for data.

Distilling HTTP request data into a list of website pages the user has visited is not a straightforward process. A number of evaluation methods can be employed, the combination of which can yield a list of website pages. The evaluation methods include: 1) Observing the content-type field in the HTTP request's response header. Typically, the response for a website page request will contain a content-type of "text/html." The content-type is not always returned; additionally, a website page may submit requests to ad servers that return a content-type of "text/html". Consequently, content type is a possible indication of a visit to a user-requested website page but it may yield a false positive or a false negative; 2) Determining the file extension if a request includes a file name. The extension alone will not confirm the request is for a website page, but it can virtually exclude it as such. Over 99.9 percent of all website-page addresses belong to the following collection: they have no extension or one of several dozen file extensions (e.g., htm, html, php, etc.). If the request has a file extension excluded from this collection, it is likely not a user-requested web page (e.g., jpeg, gif, etc.); 3) Analyzing the "referrer" field in the request header. If a succession of requests occur, all specifying the same referrer, it is very likely the referrer is a website page, although this is not always the case, as some ad links will make a succession of requests; 4) Timing the requests. If a series of requests are made within a short time (e.g., a one-second period), it is likely the requests are being made by a page and not by the user clicking on links or directing a browser by typing in URLs; 5) Comparing the website addresses in HTTP requests with a list of known advertising server website addresses; 6) Observing website addresses for names containing text that implies the website is an ad server. Names such as "ads.abc.net" or "ad-server.xyz.com" would fall into this category. In an embodiment, the tool 301, upon discerning that a server is an ad server, can forward the name of the ad server to the server 407 for purposes of dissemination of the ad-server identity. By applying all six of these evaluation methods and assigning to each a proprietary weighting, tool 301 can identify user-requested website pages.

Once the first top-level page of a site is requested, tool 301 is operable to employ the following algorithm:

1) Log the time of the initial request;

2) If one or more subsequent requests for a top-level page (ignoring any sub-content request) appear within 5 minutes of the last request, increment the total time spent on the site by the difference between the time of the most recent page request and the time of the last page request.

3) For each top-level or sub-content page request, record the total bytes downloaded by that request. Also record the speed to download from this domain, where speed=(total bytes)/(time taken).

4) If no further page requests occur for this site/domain then add a predetermined (e.g., 30-second linger time) to the last page request and record the (domain, time-spent, average-speed, total-bytes) entry.

5) Furthermore, if one of the sub-content HTTP requests returns a Content-Type of application/octet stream, the download is assumed to be a file of some form (e.g., downloading a setup installer for an application). Tool 301 can infer the filename of the download from the requested URL and keep track of the total size and file name.

As described in further detail below, this information can be used in reports to further detail the case where a particular site or domain has a large amount of downloaded traffic. A report recipient can thus discern which files were downloaded and the sites from which they were downloaded.

Similarly, the collection module 409 can determine which applications are instantiated on the associated host computing device, and the amount of time that the application has focus (i.e., is in the foreground relative to other applications that may be simultaneously open). In an embodiment, this application usage data may be collected as follows: A system timer associated with or accessible to the tool 301 may be set to prompt the tool every minute. Once prompted, collection module 409 checks to see if any user input has occurred in the last 60 seconds (e.g., the mouse moved, a key was pressed on the keyboard, etc.). If not, this time period or "slice" is ignored, and the computer is considered 'idle'. If user input has occurred, collection module 409 determines the identity (i.e., window handle) of the foreground window or application in focus.

In an embodiment, tool 301 can access a list of "blacklisted" or other applications indicated as "of interest" by a user. These might be standard windows dialogs or configuration consoles, about which reporting time spent is less meaningful to the user. The tool 301 can function to flag or otherwise highlight in a report applications that were run as safe, not safe, were a hacker risk, etc. The tool 301 can further function to flag or otherwise highlight in a report applications that have never previously showed up in a report (e.g., applications never before run by a particular user). As such, from the window handle, collection module 409 determines if a) the application is of interest to the user and b) a "friendly name" for the application (i.e., a name of the application that may more readily identify the application to the user) as described in further detail below. The application name and associated time interval is then logged. The collection module 409 keeps a tally of the total time spent in each application and uploads that information (preferably, but not necessarily, encoded in XML) each hour or other predetermined time interval to the server computer 407. As illustrated in FIG. 5, a list 505 of these applications may subsequently be presented in a report.

As discussed above, collection module 409 may determine a "friendly name" for the application. For example, if Microsoft Word is currently active, the collection module 409 can find the application handle for Word and then determine the process name, which would be "winword.exe". This process name would likely be meaningless to the user. The collection module 409 is operable to locate the associated file at its storage location and extract from the file any "File Description" information that might describe the application and/or its usage in a more familiar manner.

In addition to application information, the network management tool 301 may collect other desired information relating to the operation of the network 101 or one or more computing devices within the network 101. For example, some implementations of a network management tool 301 may record the amount and/or speed of data traffic coming into the network 101, the amount and/or speed of data traffic within the network 101, or some combination thereof.

To collect this network-utilization data, in an embodiment, collection module 409 polls the network adapter (e.g., network interface 227) on the associated computer to query inbound and outbound network statistics. These statistics yield the total bytes received or sent by that network adapter since the computer was booted. Every 15 seconds, collection module 409 records this information into 'byte slices'—the number of bytes sent/received in a 15 second slice. If the computer starts up in the middle of a slice, the slice can be rounded to the nearest boundary (that is, if a typical slice occurs at 0, 15, 30 and 45 seconds, a computer starting up at 39 seconds can record a slice of 39-45 seconds vs. 30-45 seconds). Each hour information transmission module 411 can attempt to push its recorded information to the server 407. This information can be encoded in XML for the sake of transfer and the package can include the local time zone information of the PC in question and time slices in Coordinated Universal Time (UTC) format. The collection module 409 can then assemble these time slices into one-hour windows for illustration in a graph 501 (FIG. 5) based on the recipient's local time zone.

If information transmission module 411 was not able to upload to the server 407 on this hourly or other periodic interval, the information can be queued on the associated computer for upload later when a connection can be established. If information transmission module 411 is not able to contact the server 407 for several days or other predetermined length of time, the collection module 409 can truncate the backlog of collected data as such data becomes less relevant over time.

One or more tools 301 can also collect data describing the activity history of various network devices. For example, for each device in a given predetermined period (e.g., 24 hours), a collection module 409 is operable to track when a particular device comes online and goes offline (e.g., is powered up and powered down) and note how many hours such device was online. This feature can be useful to parents wanting to monitor a child's usage of, for example, an XBOX 360 game console. As illustrated in FIG. 5, an illustration 507 of this history may subsequently be presented in a report.

One or more tools 301 can collect data on associated devices to enable the reporting module 403 to prepare a report showing remaining disk space on each device, as well as amount of fragmentation on such disks.

Alternatively or additionally, rather than simply reporting the data (e.g., "KidsPC has 20 Mb of disk space left and is 43% fragmented"), the reporting module 403 can apply heuristics to the inbound data as part of building the report. These heuristics can interpret the data on behalf of the user, explain the implications in terms that the user can understand, and make recommendations on how to solve any detected problems (e.g., "buy more storage," "defragment the computer," etc.).

Additionally, one or more tools 301 can collect data on associated devices to enable the reporting module 403 to prepare a report showing newly installed applications within a predetermined time period. For example, if the BitTorrent application was installed on a child's PC, it is likely that the child's parents would be interested to see this reported.

In an embodiment, tool 301 can include, refer to or otherwise access on the Internet 107 a dataset that includes a risk rating for applications. For example, if collection module 409 determines that a program called "HackerSoft"

was recently installed on the device in question (e.g., "KidsPC"), and further determines from the dataset that HackerSoft is a security threat, the associated report may include a warning that HackerSoft is a dangerous application and has been installed on KidsPC.

As earlier alluded to, all information describing the network and collected by the tool 301 as discussed herein may be uploaded to the reporting module 403. For example, with some implementations of the invention, one or more network management tools 301 may provide network information to the reporting module 403 on a regular periodic basis, such as once a day.

In response to receiving the recorded information for the network 101, the reporting module 403 can organize the collected network information into a desired format, and provide the collected network information to one or more authorized parties associated with the network 101. For example, with some implementations of the invention, the reporting module 403 may send the collected network information directly to the authorized party by electronic mail. With some implementations of the invention, the reporting module 403 may send an electronic mail message with the collected network information to the authorized parties on a periodic basis, such as a once a day at midnight. Alternately or additionally, the reporting module 403 may send an electronic mail message with the collected network information to the authorized parties in response to a specific request from an authorized party.

With still other implementations of the invention, the reporting module 403 may post the collected network information to a location available to the authorized parties. For example, the reporting module 403 may post the collected network information to a Web site that is secured from access by anyone other than the authorized parties or their designee. In this manner, the authorized parties can retrieve and examine the most recent collected network information whenever desired. Of course, some implementations of the invention may provide the collected network information to the authorized parties using both electronic mail and by posting the collected network information to a site remotely accessible to the authorized parties. Further, still other communication techniques (e.g., text messaging, instant messaging, etc.) may be alternately or additionally employed to provide some or all of the collected network information to the authorized parties.

Furthermore, in an embodiment, the collection module 409 and reporting module 403 may cooperate to offer the user the ability in this web-based view to show real-time reports, so that the user can see the network data changing on the fly as collected.

In an embodiment, and for privacy reasons, at the time of data upload to the receiving module 405, the reporting tool 401 returns a random short alphanumeric "record locator" code that is associated with the user's information. This short code is then stored on the user's home network 101, and the uploaded data set is associated with the network on the server 407.

When the user calls a customer service representative (CSR) regarding the reporting functionality discussed herein, the first thing a CSR can ask the user is to read out the short code from UI generated by tool 301. The CSR can then use this digit to lookup the record in the database and associate it with the user on the phone.

In an embodiment, to further aid in identity protection, the short code also carries a tunable expiration date. When the end-user calls the CSR and relays the code, the token may only be valid for the next 24 hours (current default) from when the CSR uses the code to lookup a record.

Each such upload is a snapshot at the time of upload. This allows for the ability of comparing the differences of the data between two specific dates. For example, if a CSR wants to know "what changed on your network in the last 3 days," they can compare today's snapshot of data with one from 3 days ago.

In an embodiment, to enable a user to receive or otherwise access such reports, a user interface (not shown) may be generated by tool 301 or accessed via website. The interface may show a list of devices on the user's network that are capable of collecting report data. The user can then indicate the devices for which the user wishes reports. The user can then enter an email address to which reports should be delivered.

Figure 6:
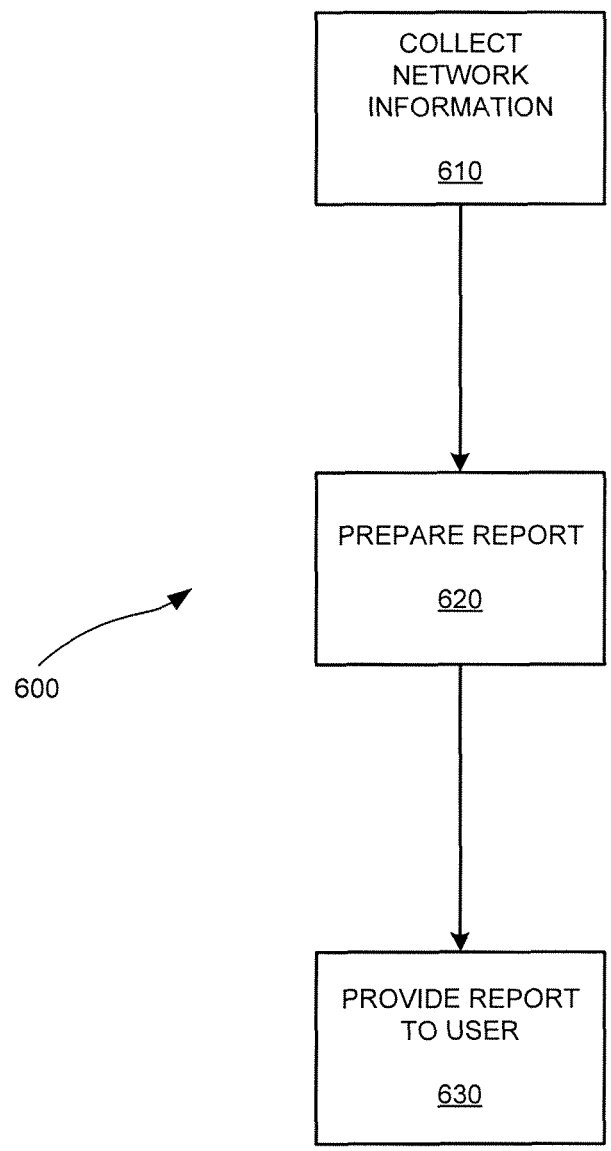
FIG. 6 is a flowchart illustrating a process according to an embodiment of the invention.

FIG. 6 illustrates a process 600, according to an embodiment of the invention. The process 600 is illustrated as a set of operations shown as discrete blocks. The process 600 may be implemented in any suitable hardware, software, firmware, or combination thereof. As such the process 600 may be implemented in computer-executable instructions that can be transferred from one computer, such as server 407, to a second computer, such as a device on network 101, via a communications medium, such as Internet 107. The order in which the operations are described is not to be necessarily construed as a limitation.

At a block 610, information characterizing a metric associated with a remote network is collected from the remote network. In an embodiment, this information collection involves providing to the remote network a network management tool executable on at least one electronic device of the remote network. For example, the administrators of the server 407 may provide the tool 301 to the user of the network 101. As such, the tool 301 may cooperate with devices on the network 101 to collect data and information (e.g., network traffic, browsing history, application usage, etc.) described herein and provide such data and information to the server 407.

At a block 620, a report describing the metric is automatically prepared. For example, upon receiving data from the tool 301, the reporting module 403 can prepare a report including elements such as those shown in FIG. 5. In an embodiment, this report preparation may involve accessing a third-party data set. For example, a software-application and/or website rating dataset may be accessed on the Internet 107 to provide the user further information on sites visited or applications installed.

At a block 630, the report is automatically provided to a user. For example, once the report is prepared, the reporting tool 401 may send the report to a user's email address. In an embodiment, this report provision may involve providing the report to the user via a web page accessible by the user.

CONCLUSION

While embodiments of the invention have been described with respect to specific examples including presently preferred modes of carrying out the invention, those skilled in the art will appreciate that there are numerous variations and permutations of the above described systems and techniques that fall within the spirit and scope of the invention as described herein.

What is claimed is:
1. A monitoring system, comprising:
    a first network management tool executable on a first computer device and comprising:

a first device information collection module configured to collect information relating to the first computer device, wherein the information collected by the first device information collection module includes application information relating to software applications run by the first computer device and network information relating to a network in which the first computer device is a member, wherein the application information includes an amount of data downloaded from a website by at least one of the software applications and for each top-level or sub-content page request, a number of bytes downloaded by each top-level or sub-content page request, wherein the network information includes byte traffic across the network, wherein the first device information collection module is further configured to determine if the website is a user-requested website page and if the website page has been previously requested;

an information transmission module configured to transmit collected information to an electronic device remote from the first computer device, wherein the electronic device is a gateway; and a reporting tool configured to associate the first computer device with a code and provide the code to the first computer device, wherein the reporting tool is executable on a server computing device and comprising:

an information receiving module configured to receive the collected information, and an information reporting module configured to generate a report based on the collected information, wherein the generated report includes information about the website, wherein the first computer device is configured to detect a network to which the first computer device is attached, wherein the first computer device is further configured to query a plurality of devices in the network for their respective Internet protocol (IP) addresses and to query any locally connected devices, and wherein the first computer device is configured to monitor a status of at least some of the devices that it has identified as being attached to the network, wherein the information reporting module is configured to access a third-party data set and generate the report based on the data set.

2. The monitoring system recited in claim 1, further comprising:
a second network management tool executable on a second computer device and comprising:
a second device information collection module configured to collect information relating to the second computer device, and an information sharing module configured to share the information relating to the second computer device with the first computer device; and
wherein the first network management tool further includes a synchronization module configured to receive the information collected by the first device information collection module, receive the information collected by the second device information collection module, synchronize the information collected by the first device information collection module with the information collected by the second device information collection module, and provide the synchronized collected information to the information transmission module.

3. The monitoring system recited in claim 2, wherein the first computer device and the second computer device are members of a network.

4. The monitoring system recited in claim 1, wherein the application information includes total time of use of at least one of the software applications.

5. The monitoring system recited in claim 1, wherein the first device information collection module is configured to determine, for at least one of the software applications having a first identifying name, a second identifying name.

6. The monitoring system recited in claim 1, wherein the information collected by the first device information collection module includes peripheral information relating to peripheral devices connected to the first computer device.

7. The monitoring system recited in claim 1, wherein the information collected by the first device information collection module includes configuration information relating to a configuration of the first computer device.

8. The monitoring system recited in claim 1, wherein the information transmission module is configured to transmit collected information to the server computing device using extensible markup language files.

9. The monitoring system recited in claim 1, wherein the information reporting module is configured to provide the report to a user via electronic mail.

10. The monitoring system recited in claim 1, wherein the information reporting module is configured to provide the report to a user via a web page accessible by the user.

11. A method, comprising:
collecting, from a remote network by a first computer device, information characterizing a metric associated with the remote network, wherein the information collected by the first device information collection module includes application information relating to software applications run by the first computer device and network information relating to a network in which the first computer device is a member, wherein the application information includes an amount of data downloaded from a website by at least one of the software applications, for each top-level or sub-content page request, a number of bytes downloaded by each top-level or sub-content page request, wherein the network information includes byte traffic across the network, wherein the information includes data used to determine if the website is a user-requested website page and if the website page has been previously requested;
automatically preparing a report describing the metric, wherein the report includes information about the website; and
automatically providing the report to a user, wherein the first computer device is configured to detect, identify, and name the remote network to which the first computer device is attached, and wherein the first computer device is further configured to query a plurality of devices in the remote network for their respective Internet protocol (IP) addresses, and to query any locally connected devices, wherein the first computer device is configured to monitor a status of at least some of the devices that it has identified as being attached to the remote network, wherein an information reporting module is configured to access a third-party data set and generate the report based on the data set.

12. The method of claim 11 wherein collecting information comprises providing to the remote network a network management tool executable on at least one electronic device of the remote network.

13. The method of claim 11 wherein preparing a report comprises accessing a third-party data set.

14. The monitoring system of claim 1, wherein the information about the website includes a trustworthiness rating for the website.

15. A method comprising:
- collecting information relating to a plurality of electronic devices coupled to a local network, wherein the information collected includes application information relating to software applications run by each of the electronic devices, network information relating to a network in which each of the electronic devices is a member, and websites accessed by each electronic device; and
- generating a report based on the collected information, wherein the report includes the application information and for each website accessed by each electronic device, the report includes a common name identifier for a specific electronic device that accessed each website, an amount of data downloaded from each website, for each top-level or sub-content page request, a number of bytes downloaded by each top-level or sub-content page request, an amount of time spend on each website, byte traffic across the local network, information about each website, if the website page has been previously requested, and a trustworthiness rating for each website, wherein the report is generated by an information reporting module and the information reporting module is configured to access a third-party data set and generate the report based on the data set.

16. The method of claim 15, wherein the information collected further includes data to determine if the website is a user-requested website page.

* * * * *